United States Patent [19]

Kanoh et al.

[11] Patent Number: 5,346,666
[45] Date of Patent: Sep. 13, 1994

[54] BLOW MOLDING PROCESS AND APPARATUS FOR PRODUCING HOLLOW PLASTIC ARTICLES

[75] Inventors: Yoshiaki Kanoh; Hiroaki Furuya; Hiroyuki Takatori, all of Ube, Japan

[73] Assignee: Ube Industries, Ltd., Ube, Japan

[21] Appl. No.: 849,715

[22] Filed: Mar. 11, 1992

[30] Foreign Application Priority Data

Mar. 12, 1991 [JP] Japan .................................. 3-046840
Mar. 27, 1991 [JP] Japan .................................. 3-087518

[51] Int. Cl.$^5$ ...................... B29C 49/04; B29C 49/16; B29C 49/64
[52] U.S. Cl. .................................. 264/521; 264/529; 264/540; 425/526
[58] Field of Search ............... 264/529, 535, 540, 525, 264/521; 425/526, 530, 532

[56] References Cited

U.S. PATENT DOCUMENTS

| | | | |
|---|---|---|---|
| 1,848,940 | 3/1932 | Delpech | 425/526 |
| 2,349,177 | 5/1944 | Kopitke | 264/540 |
| 3,114,931 | 12/1963 | Pelikan | 425/526 |
| 3,579,622 | 5/1971 | Shaw et al. | 264/529 |
| 3,690,804 | 9/1972 | Nave | 264/529 |
| 5,017,126 | 5/1991 | Yamada et al. | 264/535 |

FOREIGN PATENT DOCUMENTS

| | | | |
|---|---|---|---|
| 1450395 | 7/1966 | France | 264/529 |
| 1524904 | 5/1968 | France . | |
| 2125133 | 9/1972 | France . | |
| 2389477 | 12/1978 | France . | |

OTHER PUBLICATIONS

"Konzipiert fur Verpackungen und Technische Blasteile," Plastverarbeiter, vol. 36, No. 4, Apr. 1985, Speyer, W. Germany, pp. 16-18.
Japanese Patent Abstract, vol. 7, No. 189 (M-237) (1334), Aug. 18, 1983, corresponding to Japanese Patent Appl. No. 56-188371.
Japanese Patent Abstract, vol. 6, No. 172 (M-154) (1050), Sep. 7, 1982, corresponding to Japanese Patent Appl. No. 55-160558.
European Search Report of Appln. No. EP 92 10 4268, dated Jun. 17, 1992.
Modern Plastics Encyclopedia 88, Oct. 1987 pp. 203, 205, 206, 228, 230-231, 246, 248, 250.

*Primary Examiner*—Catherine Timm
*Attorney, Agent, or Firm*—Finnegan, Henderson, Farabow, Garrett and Dunner

[57] ABSTRACT

An improved process and apparatus for blow molding of engineering plastic materials, using a mold and an extrusion machine with a die for producing a hollow plastic parison to be partially received in the mold. An extrusion operation and a preblowing operation with air from the die into the parison are concurrently commenced at a high extrusion speed and a low air pressure, with a material remaining in the die being integrated with an upstream portion of a preceding parison prepared in a preceding blow molding run, to complete the downstream parison. The upstream portion has a closed and free lower end prepared in the preceding run. The apparatus is provided with a pinching and cutting device for self-adhering and separating the completed parison above and in the vicinity of the mold to prepare the above mentioned closed free end. In an embodiment, a heater is provided to heat the upstream parison portion immediately after the parison is separated into the upstream portion closed at the free lower end and a downstream portion to be received in the mold for blow molding and until immediately before a next extrusion.

6 Claims, 5 Drawing Sheets

BLOW MOLDING PROCESS AND APPARATUS FOR PRODUCING HOLLOW PLASTIC ARTICLES

BACKGROUND OF THE INVENTION

1. Field of the Invention

The present invention relates to an improved process and apparatus for blow molding. In particular, it relates to a process and apparatus producing molded hollow articles formed of an engineering plastic material.

2. Description of the Related Art

Figure 1:
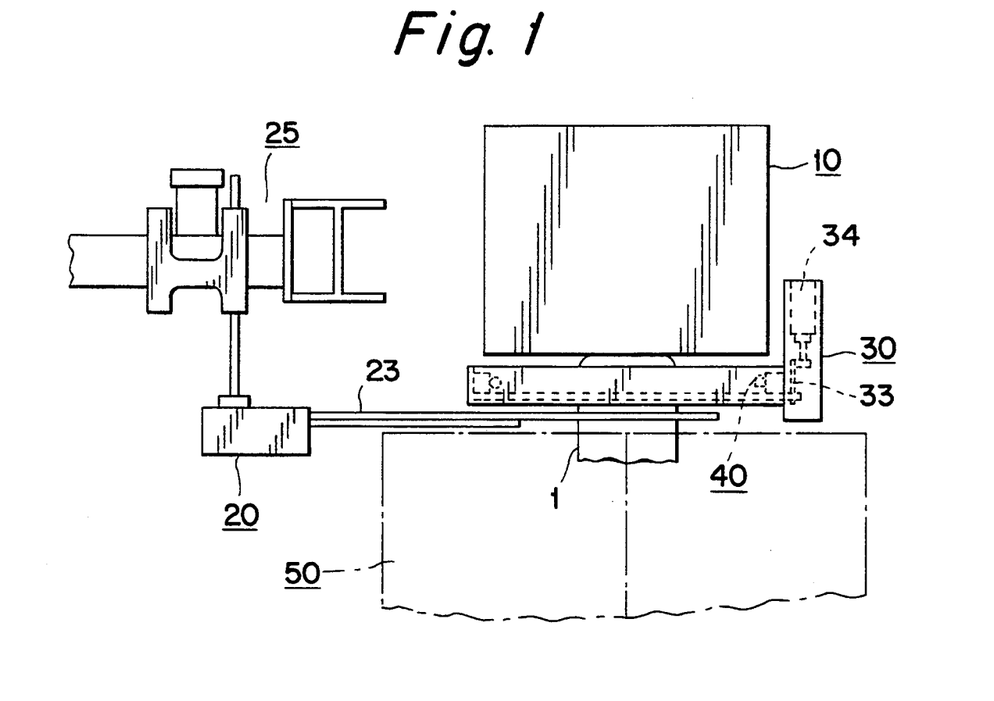
FIG. 1 is a front view partially showing a blow molding apparatus of the present invention having an article removing device and a pinching and cutting device with a heater, below a die of an extrusion molding machine.
Figure 3:
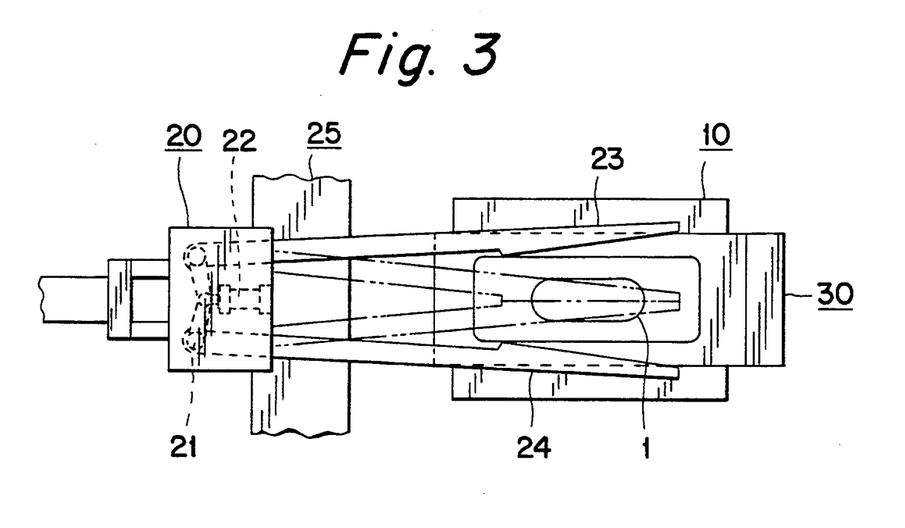
FIG. 3 is a bottom view showing the article removing device of FIG. 1.

The blow molding process is a well known method of producing hollow plastic articles, and according to a prior art, an extrusion machine having a die defining a downwardly extending annular melt passage is used in combination with air blowing means, a mold provided below the die including two mold halves defining a cavity, an article removing device as shown in FIGS. 1 and 3 for pinching a parison forming a molded article at a portion thereof above the mold, and removing the parison when the mold is opened, and a pinching device for pinching the parison at a free end thereof.

The process comprises the steps of: plasticizing and metering a plastic material within the machine, extruding the plasticized and metered material in a hollow form through the die annular passage toward the mold, when the mold is opened, preblowing air at a lower pressure from the die into the interior of the extruded hollow material during the extruding step, to produce a parison having a longitudinal hollow form, to be partially received in the mold and molded to form the article within the cavity. The mold is cooled while the mold halves are clamped to each other with the parison therebetween, and air is blow into the parison at a higher pressure from the mold, following the preblowing. When the mold is opened the parison is pinched or grasped by the removing device, and after the mold is opened, the parison is removed by the device, with the result that the parison is drawn from or torn off the die at a free end thereof.

A next extrusion is commenced at a lower extrusion rate or speed, after the instant parison is separated from the die, to produce a next or succeeding parison. A leading portion of the next parison formed due to the initial stage of the next extruding step at the lower speed is self-adhered by the pinching device at its free end, whereby the free end is closed for a next preblowing step with air into the next parison to be completed. After the pinching operation, the extrusion is switched from the lower speed to a higher speed to produce a following portion of the next parison, and the next preblowing step is commenced concurrently with the later stage of the next extruding step at the higher speed, to complete the next parison.

Figure 5A:
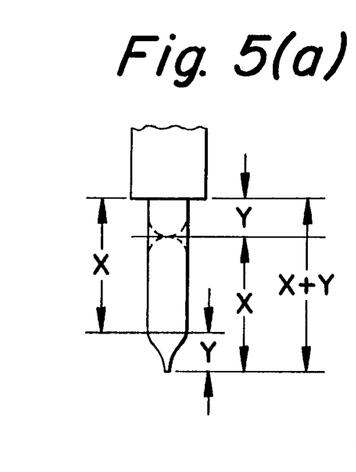
FIG. 5(a), 5(b) and 5(c) and FIGS. 6(a) and 6(b) are schematic views of various blow molding processes according to the present invention, identified as Cases A, B and C, and according to the prior art, wherein: a combination of FIGS. 5(a) and 5(b) shows Case A of the present invention; a combination of FIGS. 6(a) and 6(b) shows Case B and Case C of the present invention; and a combination of FIGS. 5(a) and 5(c) shows the prior art case.
Figure 8:
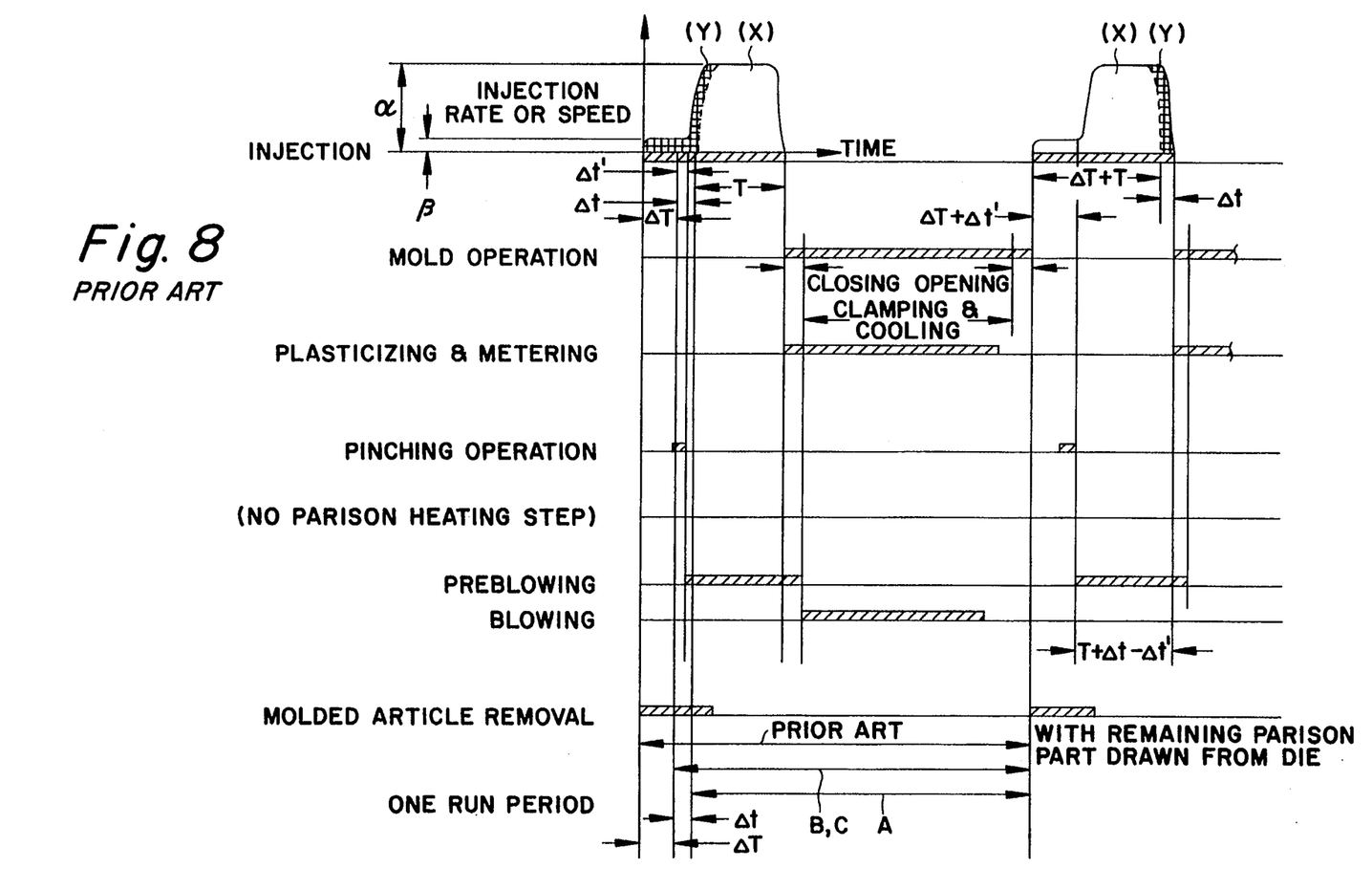
FIG. 8 is a process time chart corresponding to FIG. 7 and illustrating the steps of the prior art process incorporated with diagrams illustrating a dynamic extrusion mode of the prior art.

The above conventional blow molding process is illustrated in FIGS. 5(a) and (c) and FIG. 8, wherein (X+Y) corresponds to a complete parison consisting of both leading and following portions, $\Delta T$ is the period of time of the initial extrusion stage at the lower speed $\beta$, and $\alpha$ denotes the higher extrusion speed. The leading and following portions of the parison in combination form a downstream portion (X) and an upstream portion Y. The upstream portion (Y) extends from the free end of the die to a pinching position above and in the vicinity of the mold. The downstream portion x is partially received in the mold with at least the closed and free lower end of the parison, i.e., a lower end portion ($\Delta X_2$) of the downstream portion (X) being excluded from the cavity at a lower end thereof, and an upper end portion ($\Delta X_1$) of the downstream portion (X) being excluded from the cavity at an upper end thereof and extending upwardly from the top of the mold.

The upper end portion ($\Delta X_1$) and a lower end portion ($\Delta X_2$) of the downstream parison portion (X), and the upstream parison portion (Y) integrated with said upper end portion ($\Delta X_1$) are all wasted, after the molded article is separated therefrom by the removing device, provided that said lower end portion ($\Delta X_2$) is excluded from the cavity. The initial extrusion stage at the lower speed $\beta$ until termination of the pinching operation is carried out over a time of $$\Delta t' + \Delta T \left[ = \frac{\beta}{\alpha - \beta} \Delta T \right],$$

and the later extrusion stage at the higher speed $\alpha$ and the preblowing step are concurrently carried out over a time of $$T + \Delta t - \Delta t' \left[ = \frac{1}{\alpha}(x + y) - \frac{\beta}{\alpha - \beta} \Delta T \right].$$

The downstream portion X of the parison is prepared in both the initial and later extrusion stages over a time of $$\Delta T + T \left[ = \Delta T + \frac{X}{\alpha} \right],$$

and the upstream portion Y of the parison is prepared in the later extrusion stage at the higher speed $\alpha$ over a time of $$\Delta t \left[ = \frac{Y}{\alpha} \right],$$

wherein:

$$0 < \Delta T \leq \left( \frac{1}{\beta} - \frac{1}{\alpha} \right); \quad T = \frac{X}{\alpha}; \text{ and } \beta < \alpha.$$

Recently, engineering plastic materials have been used as advantageous materials for plastic blow molded articles, as they have a high thermal resistance. But a physical melt property thereof causes a hot parison to be drawn down or elongated excessively relative to that of normal plastic materials. In this regard, a high extrusion, i.e., an extrusion at a high rate or speed, is desired to prepare a better parison to be received in a shorter time in the mold, for producing an article with a higher quality, but as stated above, the extrusion must be carried out at the lower speed $\beta$ rather than the higher speed $\alpha$ to allow the pinching device to self-adhere by a free end of a new parison.

In this regard, the initial extrusion stage at the lower speed $\beta$ is not preferable for producing a desired parison, and it is desired that such a parison be prepared at a higher average extrusion speed from the beginning to thereby improve the quality of articles and shorten a shot cycle or time of a blow molding run, to thus increase the productivity of the blow molding, if possible.

The above mentioned upstream portion (Y) of the parison (X+Y) must ensure that the downstream portion (X) is partially received in the mold such that at least the free lower end or the lower end portion ($\Delta X_2$) is excluded from the cavity at the lower end thereof, and at least the upper end portion ($\Delta X_1$) is excluded from the cavity with the upper end thereof extended form the top of the mold, and with the main part properly received in the cavity. A length of the upstream portion (Y) relies on a diameter of a parison of a circle form or shorter and lower diameters of a parison of an elliptic form. In general, the longer the diameter of the circular parison, the longer the upstream portion must be for a desired blow molding. The upstream portion (Y) is also required to provide a space gap between the die and the mold sufficient to allow the drawing and removal operation to be carried out, as stated above.

Figure 5B:
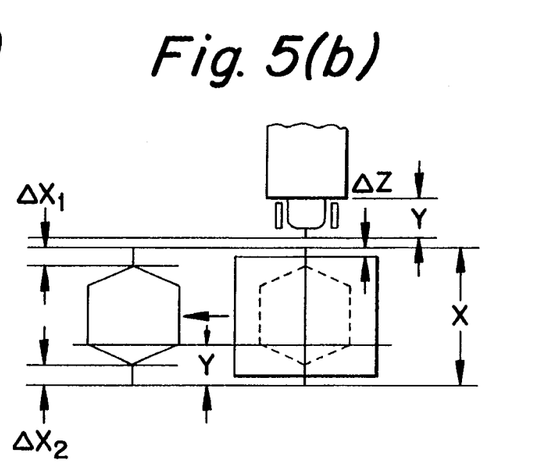
Figure 5C:
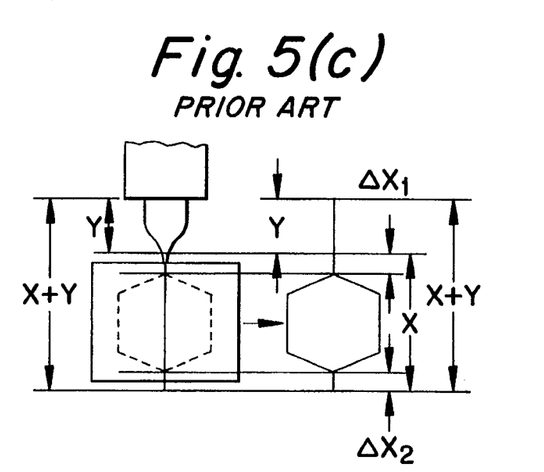

For example, with a circular parison having a diameter of 350 mm or an elliptical parison having a shorter diameter of 350 mm, the upstream portion Y has at least a length equivalent to the parison diameter (350 mm), and a length equivalent to a parison part ($\Delta Z$) between the mold and the upper parison portion Y, as shown in FIG. 5(b) is 100 to 150 mm.

SUMMARY OF THE INVENTION

An object of the present invention is to provide an improved blow molding process and apparatus enabling an average extrusion speed to be increased while substantially deleting or omitting an initial extrusion stage at a low speed as used in the prior art.

Another object of the present invention is to provide an improved blow molding process and apparatus achieving the first object while reducing an amount of a plastic material wasted per one molded article.

A blow molding process according to the present invention uses an extrusion machine having a die defining a downwardly extending annular melt passage in combination with air blowing means and a mold below the die including two mold halves defining a cavity, and comprises the steps of: plasticizing and metering a plastic material within the machine; extruding the plasticized and metered material in a hollow form through the die annular passage toward the mold, when the mold is open; and preblowing air at a lower pressure from the die into the interior of the extruded hollow material during the extrusion step, to thereby produce a parison of a longitudinal hollow form to be partially received in the mold and molded to form an article within the cavity, as in the prior art.

The process of the present invention is characterized in that both the extrusion and preblowing steps for preparing the instant parison are commenced concurrently at a relative high extrusion rate or speed, with a material remaining in the die being integrated with an upstream portion of a preceding parison prepared in a preceding blow molding run or cycle. The upstream portion has a closed and free lower end prepared in the preceding run.

The blow molding process further comprises the steps of: closing the mold and clamping the mold halves to each other with a downstream portion of the instant parison being partially received in the mold and at least the above-mentioned upstream portion of the preceding parison being excluded from the cavity at a lower end thereof; immediately after closing the mold, partially self-adhering an upstream portion of the instant parison over the entire width thereof at a lower end thereof, which end follows the downstream portion of the instant parison and is positioned above and in the vicinity of the top end of the mold, and separating the upstream portion from the downstream portion, so that said lower end of the upstream portion forms a closed and free end corresponding to the above-mentioned one of the preceding parison; following the preblowing step, blowing air at a high pressure into the interior of the downstream portion of the instant parison from the mold, while the mold is cooled, to thereby form a molded article within the cavity.

Alternatively, the blow molding process may further comprise the steps of: closing the mold and clamping the mold halves to each other with a downstream portion of the instant parison begin partially received in the mold and at least a free end of the instant parison being excluded from the cavity at a lower end thereof, which free end is the first mentioned one of the preceding parison; immediately after closing the mold, partially self-adhering an upstream portion of the instant parison over the entire width thereof at a lower end thereof, which end follows the downstream portion of the instant parison and is positioned above and in the vicinity of a top end of the mold, and separating the upstream portion from the downstream one, so that said lower end of the upstream portion forms a closed and free lower end corresponding to the first mentioned one of the preceding parison; heating the upstream portion of the instant parison closed at the free lower end thereof after closing of the mold until immediately before a next extrusion; and during the heating step and following the preblowing step, blowing air at a high pressure into the interior of the downstream portion of the instant parison form the mold, while the mold is cooled, to thereby form a molded article within the cavity.

Alternatively, with the first mentioned alternative process, the self-adhering and separating step may be commenced, not immediately after the mold closing but immediately before removal of the molded article from the mold.

According to the present invention, preferably the extrusion is effected from the beginning at a constant high speed over the entire steps period.

The first and third mentioned alternative processes of the present invention are advantageous in comparison with the prior art in that one run or cycle thereof is shortened by a time of the initial extrusion stage of the prior art, at the maximum. This is true even though a part of the extruded material in each cycle or run forming the upstream portion of the instant parison and substantially equivalent to a leading portion of the instant parison, which portion is prepared in the preceding run as a corresponding upstream portion of the preceding parison, is to be wasted, as well as the upstream parison portion of the prior art.

The second mentioned alternative process of the present invention is advantageous in comparison with the prior at in that one run period thereof is shorter than that of the first or third alternative process by a time of the extrusion at the high speed required to prepare an upstream portion of the parison corresponding to that of the prior art. Further, the second process is advantageous in that the upstream portion of the instant parison is not wasted but is used to form a lower end portion of a molded article to be produced in a next blow molding run, whereas the corresponding upstream parison portion of the first or third alternative process is wasted as well as that of the prior art.

According to the present invention, a blow molding apparatus for producing hollow plastic articles, comprising: an extrusion machine having a die defining a downwardly extending annular melt passage through which a plasticized and metered material is extruded from the machine; a preblowing means incorporated in the die for blowing air into the interior of the extruded material, so that the extruded material forms a parison to be molded to form an article; a mold, having a cooling means, provided below the die and including two mold halves defining a cavity; means for closing the mold and clamping the mold halves to each other with the parison being partially received; and means for gripping a portion of the parison excluded from the mold at a top end thereof and removing the molded article integrated therewith from the mold when the mold is opened, as in the prior art.

The apparatus of the present invention is characterized in that it further comprises: means for self-adhering the parison at an area thereof above the mold but in the vicinity of the top end of the mold over the entire width of the parison, and cutting off the parison into upper and lower parts, the lower parison part being partially received in the mold with at least a lower free end thereof being excluded from the cavity at a lower end thereof, the resultant upper parison part having a closed and free end; and means for heating the upper parison part upon the adhesion and separation of the parison and until immediately before a next extrusion.

Preferably, the heating means for the upper parison part is incorporated with said adhering and cutting means.

DESCRIPTION OF THE PREFERRED EMBODIMENTS

Embodiments of the present invention directed to a blow molding process and apparatus for producing hollow plastic articles will be now described with reference to FIG. 1 to FIG. 8, in comparison with the above-mentioned prior art.

Figure 2:
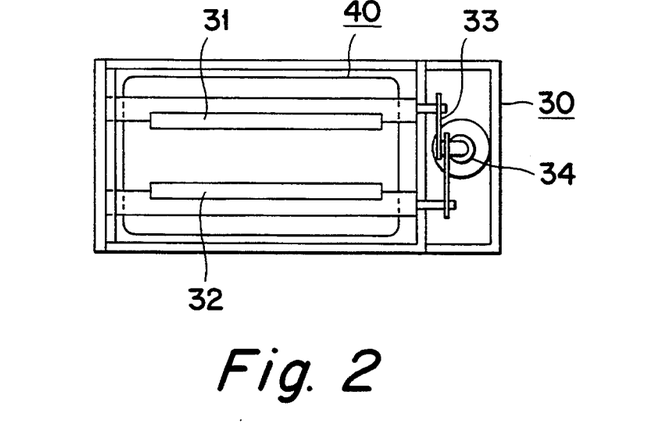
FIG. 2 is a bottom view showing the pinching and cutting device with the heater of FIG. 1.

Referring to FIGS. 1 to 3, the apparatus comprises: a conventional extrusion machine (not shown) with a conventional die 10 having an annular melt passage extending downwardly; an article removing device 20; a pinching and cutting device 30 incorporated with a heater 40; a mold 50, with a cooling device, positioned below the die 10, and; a mold clamping device.

The article removing device 20 has a toggle mechanism 21 is combination with a piston type actuator 22 and a pair of horizontally extending movable arms 23 and 24 for grasping a parison 1 to be extruded downwardly from the die 10 through the annular melt passage toward the mold, at a position between the die 10 and the mold 50. The paired arms 23 and 24 are actuated by the toggle mechanism driven by the piston type actuator 22.

Figure 4A:
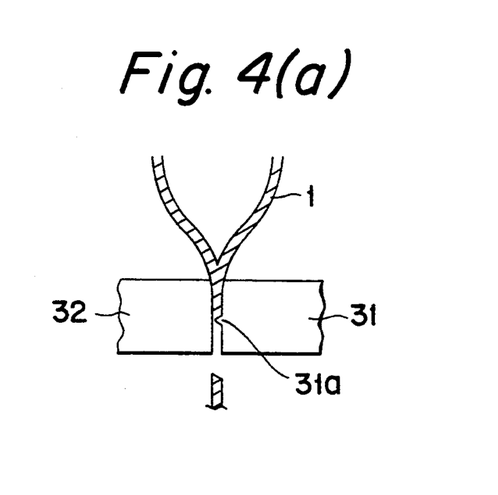
FIGS. 4(a) and 4(b) show two alternative embodiments of the pinching and cutting device.

The pinching and cutting device 30 has a pair of movable bars 31 and 32 horizontally extending in parallel; a toggle mechanism 33 and a piston type actuator 34. As shown in FIG. 4(a), the paired bars 31 and 32 have press surfaces for the parison 1, and the bar 31 is provided with a projecting blade 31a extending horizontally for cutting off the parison 1 located between the paired bars over the entire width thereof at an intermediate area or a lower end area of the press bar face.

Figure 4B:
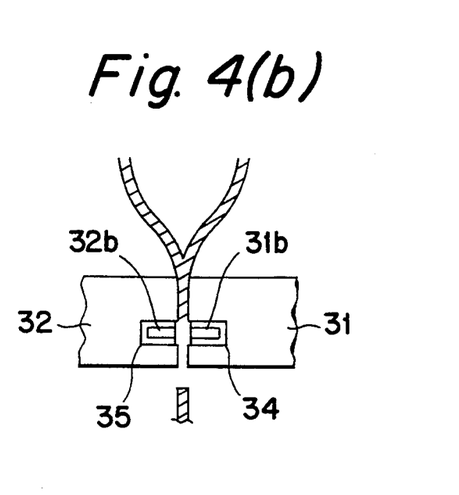

Alternatively, as a cutting means, a pair of heaters 31b and 32b may be provided as shown in FIG. 4(b) in the paired bars 31 and 32 at the press faces via thermal insulators 34 and 35 to partially melt the parison 1 over the entire width thereof, to thereby cut off the parison.

The paired bars 31 and 32 are forced to pinch the parison 1 by the actuator 34 via the toggle mechanism 30, to thereby partially self-adhere the parison at a portion pressed by the paired bars, and then the blade 31a or the paired heaters 31b and 32b effects a separation of the parison into two parts at the self-adhered portion, immediately after the mold 50 is closed, or immediately before the mold 50 is opened.

The heater 40 incorporated with the pinching and cutting device 30 is designed to surround the parison 1 and heat the separated upper part of the parison or an upstream portion of the parison, immediately after the mold 50 is closed and until a next extrusion is commenced.

The article removing device 20 has a conventional carrier 25 for forcing a unit comprising the toggle mechanism 21, the actuator 22 and the paired arms 23 and 24 to move forwardly and rearwardly in the horizontal direction to thereby remove the separated parison lower part or downstream portion of the parison forming a molded article form the mold 50, after the mold is opened, with the downstream parison portion being grasped by the paired arms 23 and 24.

The grasping action by the article removing deice 20 is taken immediately before the self-adhering and separating action by the pinching and cutting device 30, and the article removing action by the carrier 25 is taken with the downstream parison portion being grasped immediately after the mold 50 is opened.

A blow molding process of the present invention may use the apparatus equipped with all of the devices as explained with reference to FIGS. 1 to 3 and FIGS. 4(a) or 4(b) or those excluding the heater 40. Three embodiments of the process, identified as Case A, Case B and Case C, will now be explained with reference to FIGS. 5(a) and 5(b), FIGS. (6a) and 6(b) and FIG. 7, in comparison with the prior art shown in FIGS. 5(a) and 5(c) and FIG. 8.

Area (X+Y) corresponds to a plastic material forming a complete parison prepared in a single run in Case A or the prior art, whereas area (Y+X+Y) corresponds to a parison completed in a single run in Case B or C. Area (Y) corresponds to an upstream portion of the parison prepared in a run in Case A, B or C or the prior art, and area (X) corresponds to a parison portion partially received in the mold to form a molded article in Case A, B or C or the prior art.

Extrusion by the extrusion machine in Case A, B or C is commenced to prepare a parison at a high speed after the mold opening, with a separated upstream part or portion (Y) of a parison (X+Y) completed in a preceding run having a closed and free lower end being integrated at an upper end with a plastic melt in the die 10 and extending from the die. In Case A, the injection is commenced upon termination of the below-mentioned heating step.

A mold operation by the mold clamping device is carried out in Case A, B or C to close the mold and clamp the mold halves to each other with a downstream portion of the parison being located between the paired mold halves. The downstream parison portion, identified as (X+Y) in Case B or C and as (X) in Case A, is separated from the upstream portion (Y) in Case A or B, but is integrated with the upstream portion (Y) in Case C, and is partially received in the mold with at least the closed and free lower end thereof being excluded from a mold cavity at a lower end thereof in Case A, and with at least a corresponding upstream portion (Y) of a preceding parison prepared in a preceding run, which portion is closed at a free lower end thereof, begin excluded from the mold cavity at a lower end thereof in Case B or C.

Figure 7:
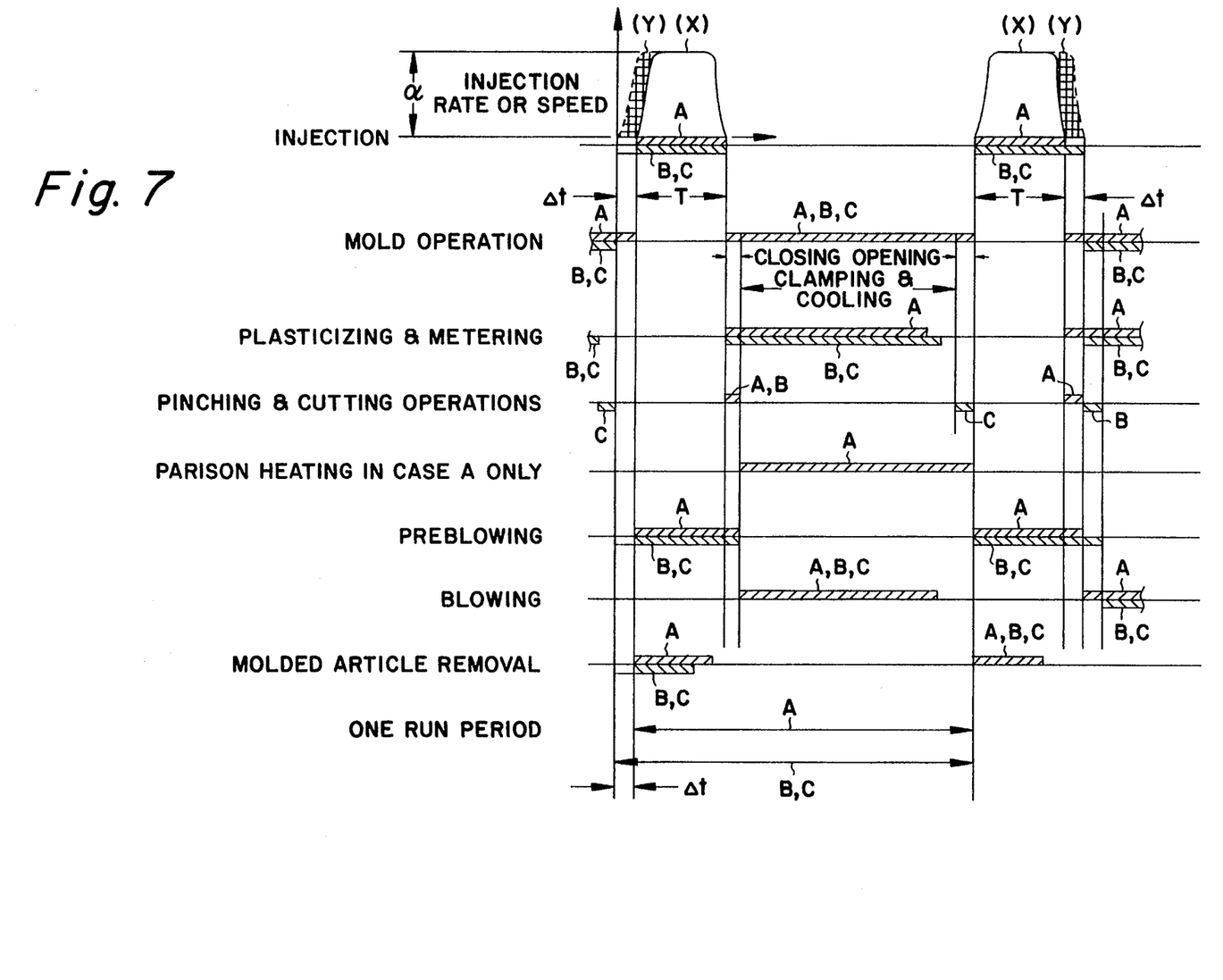
FIG. 7 is a process time chart illustrating the steps of the three processes according to the present invention, i.e., Cases A, B and C incorporated with diagrams illustrating dynamic extrusion modes of Case A and Cases B and C.

A plasticizing and metering by the extrusion machine are effected in Case A, B or C for a next run, following the extrusion, during the mold clamping and cooling.

The pinching and cutting operations by the device 30 are carried out to partially self-adhere and separate the parison 1 into the upstream portion (Y) and the downstream portion, each having a closed and free lower end. These operation are commenced in Case C immediately before the mold opening, and in Case A or B immediately after closing the mold.

Parison heating by the heater 40 is carried out in Case A only to heat the separated upstream portion (Y), having the closed and free lower end.

Preblowing by a preblowing means incorporated in the die 10 is commenced in Case A, B or C with air at a lower pressure, concurrently with the extrusion, to complete the parison 1.

Blowing by a blowing means incorporated with the mold 50 is commenced in Case A, B or C with air at a higher pressure upon termination of the preblowing into the separated downstream portion of the parison partially received in the mold to thereby produce an article molded in the cavity.

The removal of the molded article by the article removing device 20 is carried out in Case A, B or C to grasp the downstream parison portion at the upper end thereof excluded from the mold immediately before the mold opening, and remove the downstream portion from the mold. The self-adhering and separating action is taken immediately after the parison grasping in Case C only, whereas in Case A or B it is taken immediately after the mold closing.

Figure 6A:
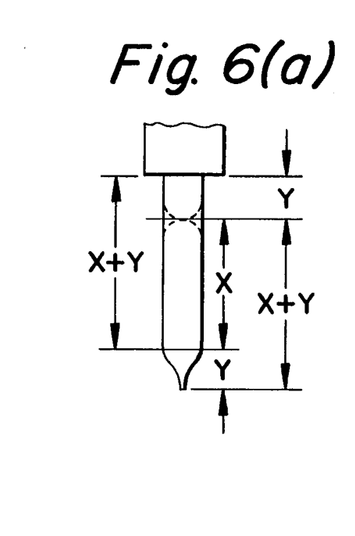
Figure 6B:
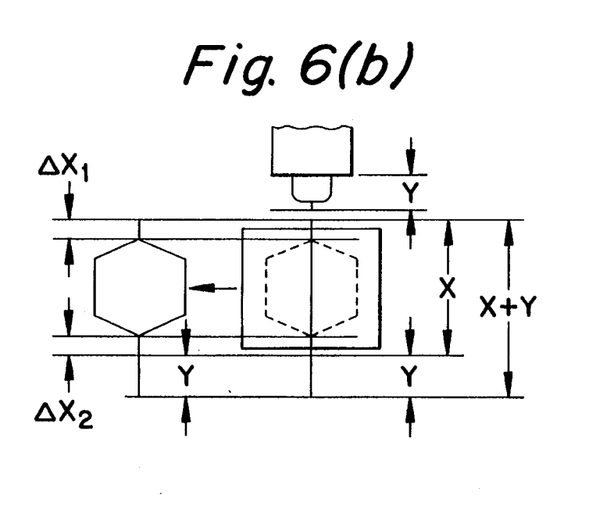

The upstream portion (Y) of the preceding parison forms a lower portion of the article molded in the instant run in Case A, whereas in Case B or C it is excluded from the article molded in the instant run and is wasted after the downstream portion (X+Y) including said preceding upstream portion (Y) is removed from the mold.

A time of the blow molding run is shorter in Case A than that in Case B or C by $\Delta t$, and is longer, as shown in FIG. 8, in the prior art than that in Case B or C by $\Delta T$, and is longer than that in Case A by $\Delta t + \Delta T$, wherein $$\Delta t = \frac{Y}{\alpha}; \quad 0 < \Delta T \leq \left(\frac{1}{\beta} - \frac{1}{\alpha}\right) Y;$$

$$\frac{Y}{\alpha} < \Delta t + \Delta T \leq \frac{Y}{\beta}; \quad \text{and } \beta < \alpha.$$

A plastic material ($W_1$) to be wasted in each blow molding run of Case B or C consists of: a leading part (Y) of the downstream portion (X+Y) of the instant parison, which part is prepared in the preceding run as the upstream portion (Y) of the preceding parison; an upper end part ($\Delta X_1$) of the downstream portion (X+Y); and a lower end part ($\Delta X_2$) of a fresh portion (X+Y) following the old leading part (Y), both excluded from the mold cavity. The fresh portion (X=Y) is prepared in the instant run. That is, $W_1 + Y + \Delta X_1 + \Delta X_2$. This is because the old leading part (Y) is cooled by the atmosphere in the previous run, with the result that it is degraded and thus must be wasted.

A corresponding material ($W_2$) to be wasted in Case A consists of an upper end part ($\Delta X_1$) and a lower end part ($\Delta X_2$) of the downstream portion (X), both excluded from the mold cavity, that is $W_2 = \Delta X_1 + \Delta X_2$. This is because the upstream portion (Y) prepared in the preceding run is not wasted, but in turn is heated sufficiently to be allowed to form a leading active part (Y) of the downstream portion (X) completed in the instant run, and thus is received in the mold cavity with the lower end part ($\Delta X_2$) being excluded, to thereby form a part of the molded article.

A corresponding material ($W_3$) to be wasted in the prior art consists of: the old and degraded upstream portion (Y); and an upper end part ($\Delta X_1$) and a lower end part ($\Delta X_2$) of the downstream portion (X) prepared in the instant run, both excluded for the mold cavity, i.e., $W_3 = Y + \Delta X_1 + \Delta X_2$.

The amount of the lower end part ($\Delta X_2$) of Case B or C can be reduced much more than that ($\Delta X_2$) of Case A or the prior art. This is because the former ($\Delta X_2$) is integrated with the old and degraded leading part (Y) to be excluded from the mold cavity, whereas the latter ($\Delta X_2$) has a closed and free lower end. As a result, Case A of the present invention is the most economical and has the highest productivity among the four cases, in both the light of a saving of the plastic material and the shortening of the urn time. Case B or C of the present invention is more economical and has a higher productivity, in the same light, than the prior art.

It is true, however, that Case B or C of the present invention can produce a molded article having the best quality among the four cases, since only a fresh hot part $(X-\Delta X_1-Y)$ prepared in the instant run at the high extrusion speed is provided in the mold cavity. The prior art can produce a molded article having a second best quality, since only a fresh hot portion $(X-\Delta X_1-\Delta X_2)$ prepared at both the lower and higher extrusion speeds in the instant run is provided in the mold cavity. Case A of the present invention produces, a molded article having a little lower quality than that of the prior art, since the mold upstream portion (Y) prepared, but heated in the previous run is provided, with a fresh following part $(X-\Delta X_1-Y)$ prepared in the instant run, in the mold cavity. That is, the molded article of Case A includes not only a fresh material but also an old material, although the old material is kept hot in the parison completed in the instant run. An improvement of the molded article in Case A relies on how the old upstream portion (Y) is heated to keep it at a desired heated level corresponding to that of the fresh following part $(X-\Delta X_1-Y)$.

Obviously, a fresh hot part of a parison prepared at a high extrusion speed in the instant run and forming a complete article molded in the instant run is the best for producing a high quality product in light of a temperature condition of the parison and the before-mentioned unfavorable "drawing down" or "elongating" phenomenon involved in the engineering plastic material. In this regard, an article molded according to Case B, Case C or the prior art has a superior quality to that of Case A. The article of the prior art, however, is somewhat inferior in quality to that of Case B or C, since the former article includes a parison part prepared in the instant run but at a low extrusion speed, which accelerates the drawing down phenomenon.

Case B or C of the present invention is carried out without the heating step using the heater 40 as shown in FIG. 2, and the self-adhering and separating step of Case B using the pinching and cutting device 30 is carried out, when the blow molding with the mold 50 in commenced, whereas the step of Case C is carried out, when the molded article is removed form the mold 50.

In this connection, the article removing device 20 of FIG. 1 for Case C may be modified by omitting the pinching and cutting device 30 with the heater 40, and providing a pinching and cutting means at its paired arms 23 and 24.

In this modification for Case C, a cutting means for separating a parison using a heater mounted on such a pinching means as that of FIG. 4 is preferable, since the upstream portion (Y) in Case C is semi-solidified due to exposure to the atmosphere during the blow molding with the clamped mold. Further it is preferable that the paired arms 23 and 24 of FIG. 3 be modified to form such a pinching means as that of FIG. 2 for Case C.

We claim:

1. A blow molding process for producing hollow plastic articles comprising:
    providing an extrusion machine having a die defining a downwardly extending annular melt passage in combination with air blowing means and a mold having a cooling means below the die including two mold halves defining a cavity, and
    performing in each blow molding run the steps of:
    plasticizing and metering an engineering plastic material within the extrusion machine;
    extruding the plasticized and metered material having a hollow form through the die annular passage toward the mold, when the mold is opened; and
    preblowing air at a low pressure from the die into the interior of the extruded hollow material during the extrusion step, to thereby produce a parison having a longitudinal hollow form to be partially received in the mold and molded to form the article within the cavity defined by said mold halves,
    wherein the extrusion machine is activated so as to elevate an extrusion speed from zero up to a level near a predetermined full speed $\alpha$ immediately after the commencement of the extruding step,
    wherein both the extrusion and preblowing steps for preparing said parison are commenced concurrently, and
    wherein a material remaining in the die is integrated with an upstream portion of a downstream parison prepared in a preceding blow molding, said portion having a closed and free lower end.

2. A blow molding process according to claim 1, further comprising the steps of:
    closing the mold and clamping the mold halves to each other with a downstream portion of said parison being partially received in the mold and at least said upstream portion of the downstream parison being excluded from the cavity at a lower end thereof; immediately after the mold closing, partially self-adhering an upstream portion of said parison over the entire width thereof at a lower end thereof, which end follows the downstream portion of said parison and is positioned above and in the vicinity of the top end of the mold, and separating the upstream portion from the downstream portion, so that said lower end of the upstream portion forms a closed and free end; following the preblowing step, blowing air at a high pressure into the interior of the downstream portion of said parison from the mold, while the mold is cooled, to thereby form the molded article within the cavity defined by said mold halves.

3. A blow molding process according to claim 1, further comprising the steps of: closing the mold and clamping the mold halves to each other with a downstream portion of said parison being partially received in the mold and at least a free end of said parison being excluded from the cavity at a lower end hereof; immediately after the mold closing, partially self-adhering an upstream portion of said parison over the entire width thereof at a lower end thereof, which end follows the downstream portion of said parison and is positioned above and in the vicinity of the top end of the mold, and separating the upstream portion from the downstream portion, so that said lower end of the upstream portion forms a closed and free lower end; heating the upstream portion of said parison closed at the free lower end there immediately after closing of the mold until immediately before a next extrusion; and during the heating step and following the preblowing step, blowing air at a high pressure into the interior of the downstream portion of said parison from the mold, while the mold is cooled, to thereby form the molded article within the cavity.

4. A blow molding process according to claim 1, further comprising the steps of: closing the mold and clamping the mold halves on each other with a downstream portion of the instant parison being partially received in the mold and at least said upstream portion of the downstream parison being excluded from the cavity at a lower end thereof; following the preblowing step, blowing air at a high pressure into the interior of the downstream portion of said parison from the mold, while the mold is cooled, to thereby form a molded article within the cavity; and partially self-adhering an upstream portion of said parison over the entire width thereof at a lower end thereof, which end follows the downstream portion of said parison and is positioned above and in the vicinity of the top end of the mold, and separating the upstream portion from the downstream one, so that said lower end of the upstream portion forms a closed and free end, immediately before removal of the molded article from the mold.

5. A blow molding process of any one of claims 2 to 4, wherein the extrusion is effected form the beginning at a constant high speed over the entire step time thereof.

6. A blow molding process any one of claims 2 to 4, wherein the extrusion is effected from the beginning at a high average speed over the entire step time thereof.

* * * * *

UNITED STATES PATENT AND TRADEMARK OFFICE
CERTIFICATE OF CORRECTION

PATENT NO. : 5,346,666
DATED     : September 13, 1994
INVENTOR(S) : Yoshiaki KANOH et al.

It is certified that error appears in the above-indentified patent and that said Letters Patent is hereby corrected as shown below:

Claim 3, col. 10, line 49, "hereof" should read --thereof--; and line 59, "there" should read --thereof--.

Signed and Sealed this

Thirteenth Day of December, 1994

Attest:

BRUCE LEHMAN

*Attesting Officer*    *Commissioner of Patents and Trademarks*